(12) United States Patent
    Mackin et al.

(10) Patent No.: US 10,486,821 B2
(45) Date of Patent: Nov. 26, 2019

(54) JET ENGINE ANTI-ICING AND NOISE-ATTENUATING AIR INLETS

(71) Applicant: The Boeing Company, Chicago, IL (US)

(72) Inventors: Steve G. Mackin, Bellevue, WA (US); Bradley S. Leisten, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 578 days.

(21) Appl. No.: 14/793,631

(22) Filed: Jul. 7, 2015

(65) Prior Publication Data

US 2017/0008635 A1    Jan. 12, 2017

(51) Int. Cl.
    *B64D 33/02*    (2006.01)
    *F02C 7/045*    (2006.01)
    *F02C 7/047*    (2006.01)

(52) U.S. Cl.
    CPC .............. *B64D 33/02* (2013.01); *F02C 7/045* (2013.01); *F02C 7/047* (2013.01); *B64D 2033/0206* (2013.01); *B64D 2033/0233* (2013.01); *F05D 2230/60* (2013.01); *F05D 2250/185* (2013.01); *F05D 2250/283* (2013.01); *F05D 2260/963* (2013.01)

(58) Field of Classification Search
    CPC .......... B64D 33/02; F02C 7/047; F02C 7/045; F05D 2260/963; F05D 2250/185
    See application file for complete search history.

(56) References Cited

U.S. PATENT DOCUMENTS

| | | | |
|---|---|---|---|
| 5,841,079 A | 11/1998 | Parente | |
| 6,371,411 B1 | 4/2002 | Breer et al. | |
| 6,688,558 B2 * | 2/2004 | Breer | B64D 15/04 244/134 B |
| 6,698,691 B2 * | 3/2004 | Porte | B64D 15/04 244/134 B |
| 7,588,212 B2 * | 9/2009 | Moe | B64D 15/12 244/134 D |
| 7,617,670 B2 * | 11/2009 | Truax | F02C 7/04 137/15.1 |
| 7,621,719 B2 * | 11/2009 | Lutjen | F01D 9/06 415/173.1 |
| 7,780,117 B2 * | 8/2010 | Botura | B64D 15/14 244/134 D |
| 8,449,246 B1 * | 5/2013 | Liang | F01D 9/04 415/115 |

(Continued)

*Primary Examiner* — Brian M O'Hara
*Assistant Examiner* — Keith L Dixon
(74) *Attorney, Agent, or Firm* — Haynes and Boone, LLP

(57) ABSTRACT

An embodiment of a jet engine air inlet providing anti-icing, and optionally, engine noise reduction, includes a rigid frame defining a gridwork of contiguous cells. A cap skin has an outer surface sealingly attached to an inner surface of the frame. An outer skin has an inner surface sealingly attached to an outer surface of the frame and contains a plurality of openings therein. Each of the openings is disposed in fluid communication with a corresponding one of the cells, each of which can comprise a Helmholtz resonator. A serpentine manifold extends adjacent to an inner end of each of the cells and contains a plurality of apertures in a sidewall thereof, each of which is disposed in fluid communication with a corresponding one of the cells.

20 Claims, 8 Drawing Sheets

(56) References Cited

U.S. PATENT DOCUMENTS

| | | | |
|---|---|---|---|
| 8,931,252 B2 * | 1/2015 | Richardson | F02C 7/04 |
| | | | 137/15.2 |
| 8,975,560 B2 | 3/2015 | Pereira et al. | |
| 8,999,512 B2 | 4/2015 | Fies et al. | |
| 9,022,736 B2 * | 5/2015 | Lee | F01D 5/186 |
| | | | 416/97 R |
| 9,476,359 B2 * | 10/2016 | Soria | F02K 1/827 |
| 9,758,240 B2 * | 9/2017 | Brown | B64C 21/06 |

* cited by examiner

JET ENGINE ANTI-ICING AND NOISE-ATTENUATING AIR INLETS

TECHNICAL FIELD

This disclosure generally relates to jet aircraft engines, and more particularly, to jet engine air inlets that function to prevent inlet icing and attenuate engine noise.

RELATED ART

Most modern commercial aircraft are powered by gas turbine or "jet" engines. All jet engines have an air inlet that directs intake air into the engine. The inlet is disposed upstream of the compressor stages of the engine, and forms the front end of a streamlined fairing, or "nacelle," that surrounds the engine. On a typical subsonic aircraft, the air inlet is generally round in transverse cross-section, has a continuous, recurvate inside-to-outside surface, and a thickness that varies continuously from the most downstream end of the inlet to the most upstream end, or "highlight," thereof.

The air inlet of an engine of a subsonic commercial jet aircraft typically incorporates a lining or "lip" on the inner surface of the inlet that functions in conjunction with an anti-icing system to prevent the formation of ice on the highlight and the inner and outer front surfaces of the inlet when flying in icing conditions. Additionally, or in the alternative, it can also be configured to attenuate forwardly propagating engine noise. One type of conventional engine inlet anti-icing and noise-reduction system includes an acoustic "lining" disposed in the inner lip of the inlet. Hot, compressed air is bled off from the engine and directed against the backside or inner surface of the lining so as to prevent ice from forming on the inlet. Openings are provided through the layer to enable the pressurized air to "transpire" from "pores" or openings in the surface of the acoustic attenuation layer, and these same openings enable sound waves to enter and be attenuated by resonator cavities disposed within the layer.

While these systems can provide satisfactory performance in a variety of flying conditions, they are not without some drawbacks. For example, the hot engine bleed air may not be uniformly distributed throughout the inlet under all flying conditions, resulting in both engine and anti-icing inefficiencies. More seriously, it is possible in some situations for the air outlet "pores" of the transpiring inlet skin to become occluded with, e.g., ice, dirt, insects, volcanic ash, or other detritus, so as to substantially block the flow of air through the skin. This not only can substantially degrade or interrupt engine inlet anti-icing protection, but under the appropriate circumstances, e.g., with an engine bleed-air pressure regulator valve locked in an open condition, can result in the inlet of the engine being separated from the engine nacelle as a result of an internal overpressurization of the inlet.

Accordingly, a need exists for systems and methods for protecting acoustically treated jet engine inlets from ice formation that overcome the foregoing and other drawbacks of the prior art systems.

SUMMARY

In accordance with the present disclosure, systems and methods are provided for designing, making and using jet engine air inlets that prevent inlet icing and attenuate forwardly propagating engine noise, while overcoming the above and other problems of the prior art systems.

In one example embodiment, a jet engine air inlet providing anti-icing, and optionally, engine noise reduction, comprises a rigid frame defining a gridwork of contiguous cells. A cap skin has an outer surface sealingly attached to an inner surface of the frame. An outer skin has an inner surface sealingly attached to an outer surface of the frame and contains a plurality of openings therein. Each of the openings is disposed in fluid communication with a corresponding one of the cells, each of which can comprise a Helmholtz resonator. A serpentine manifold extends adjacent to an inner end of each of the cells and contains a plurality of apertures in a sidewall thereof, each of which is disposed in fluid communication with a corresponding one of the cells.

In another example embodiment, a method for making a jet engine air inlet comprises providing a rigid frame defining a gridwork of contiguous cells and sealingly attaching an outer surface of a cap skin to an inner surface of the frame. An inner surface of an outer skin is sealingly attached to an outer surface of the frame such that each of a plurality of openings contained in the outer skin is disposed in fluid communication with a corresponding one of the cells. A serpentine manifold is extended adjacent to an inner end each of the cells such that each of a plurality of apertures contained in a sidewall of the manifold is disposed in fluid communication with a corresponding one of the cells. An inner surface of the cap skin is sealingly covered with a plenum. The outer skin can comprise a lip skin of a jet engine air inlet, and the plenum can comprise a portion of a "D-nose" or "D-duct" of the inlet.

In yet another example embodiment, a jet engine comprises an air inlet disposed at a front end thereof. The inlet includes a lip skin containing a plurality of openings and a rigid frame defining a gridwork of contiguous cells. An outer surface of the frame is attached to an inner surface of the lip skin such that each of the openings in the outer skin is disposed in fluid communication with a corresponding one of the cells. An outer surface of a cap skin is sealingly attached to an inner surface of the frame. A serpentine manifold extends adjacent to an inner end of each of the cells and contains a plurality of apertures in a sidewall thereof, each aperture being disposed in fluid communication with a corresponding one of the cells. A D-duct comprising a portion of a plenum sealingly covers an inner surface of the cap skin.

The manifold and the plenum can be separately supplied with high temperature engine bleed air at different pressures and flow rates so as not only to provide a more uniform distribution of anti-icing air than is effected by the prior art, but also to prevent the inlet of the engine from being separated from the engine nacelle as a result of an inlet internal overpressurization.

A better understanding of the jet engine air inlet anti-icing and sound attenuation systems and methods of the present disclosure, as well as an appreciation of the above and additional advantages thereof, will be afforded to those of skill in the art by a consideration of the following detailed description of one or more example embodiments thereof. Reference will be made to the various views of the appended sheets of drawings, which are briefly described below, and within which like reference numerals are used to identify like ones of the elements illustrated therein.

DETAILED DESCRIPTION

In accordance with embodiments of the present disclosure, novel systems and methods are provided for designing, making and using jet engine air inlets that prevent inlet icing, and optionally, attenuate forwardly propagating engine noise, while overcoming the air distribution and internal overpressurization problems of prior art systems.

Figure 1:
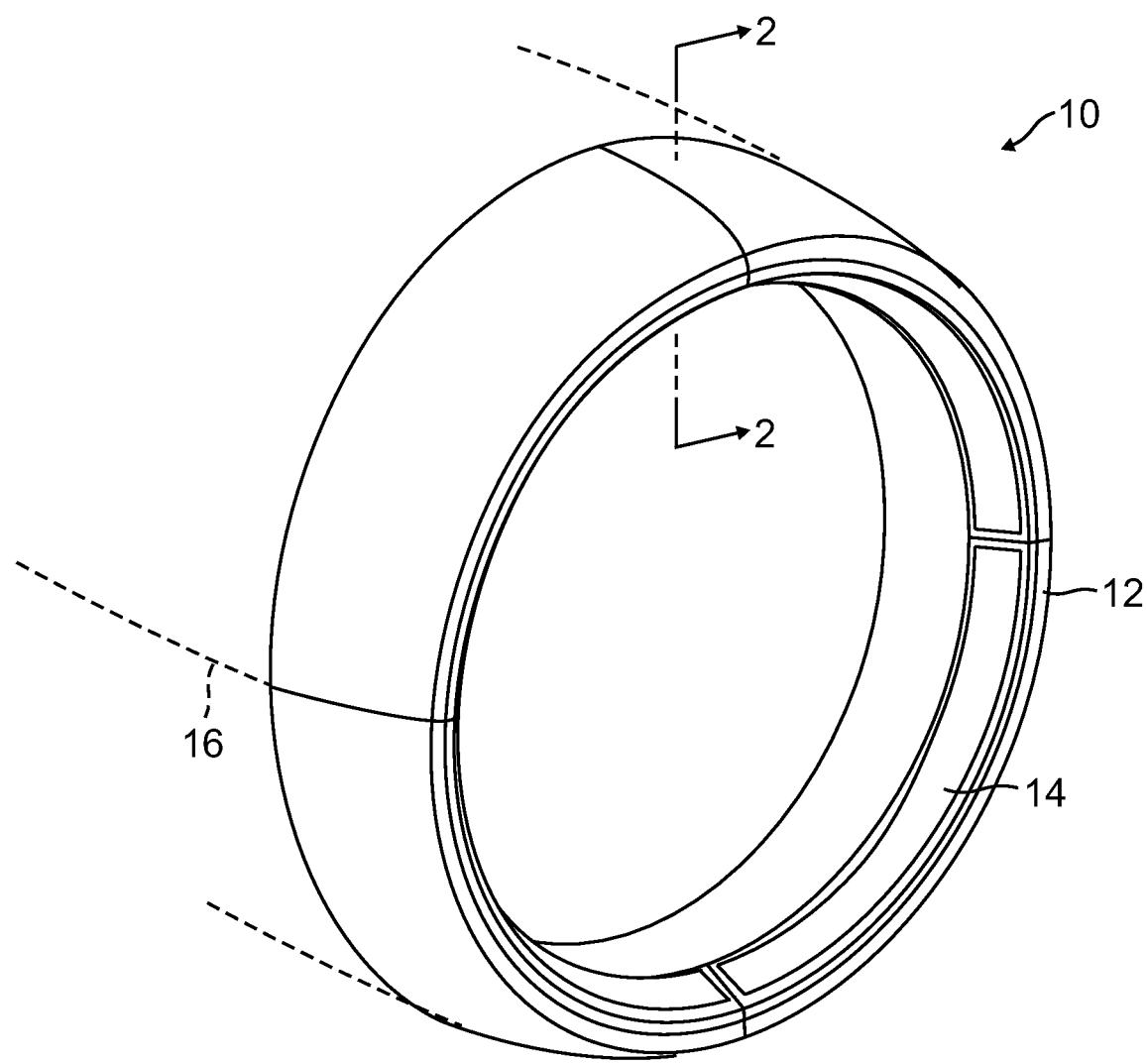
FIG. 1 is an upper, front and right side perspective view of a typical subsonic jet engine air inlet, showing a porous inlet lip skin of an anti-icing and engine-noise-attenuating system disposed therein.

FIG. 1 is an upper, front and right side perspective view of a typical subsonic jet engine air inlet 10, showing a "highlight" 12, i.e., the most upstream end of the inlet 10, as well as a porous inlet "lip skin" 14 of an anti-icing and engine-noise-attenuating system disposed therein. The inlet 10 comprises a front end of a streamlined engine "nacelle" 16 (indicated by dashed lines) disposed rearwardly of the inlet 10 that shrouds an associated jet engine (not illustrated). As illustrated in FIG. 1, the inlet 10 is generally round in transverse cross-section, has a recurvate inside-to-outside surface, in the manner of the nose portion of an airfoil, and has a thickness that varies continuously from the most downstream end of the inlet 10 to the highlight 12 thereof.

As those of some skill will know, under the appropriate meteorological conditions, the leading edges of the various features of aircraft, including the wings and engine air inlets, can accumulate ice, which, in the case of engine inlets, can interfere with proper engine operation. Accordingly, it is desirable to make provision for anti-icing protection of the inlets, as well as the other features whose performance could be degraded by the accumulation of ice.

Additionally, governmental agencies tasked with, e.g., the operation of airports, have promulgated a number of noise abatement regulations aimed at reducing the amount of noise generated by aircraft, particularly jet aircraft, operating out of those airports. Consequently, a number of techniques have been developed over time for preventing jet engine air inlet icing and for attenuating noise propagating forwardly through the inlet of a jet engine.

For example, U.S. Pat. No. 8,975,560 to D. Pereira et al., incorporated herein by reference in its entirety, describes an all-electric inlet lip de-icing system for a turbojet engine nacelle. U.S. Pat. No. 8,999,512 to G. Vauchel et al., incorporated herein by reference in its entirety, describes a turbojet air intake lip structure that incorporates a porous sound absorbing layer which permits high temperature de-icing air incident on the backside of the layer to pass through the outer surface of the inlet lip. Other combined inlet anti-icing and noise attenuating systems are described in U.S. Pat. No. 5,841,079 to C. Parente, and U.S. Pat. No. 6,371,411 to M. Breer et al., both of which are incorporated herein by reference in their entirety. As described in more detail below in connection with FIGS. 2-4, these systems can comprise an inlet lip liner that includes a plurality contiguous, honeycomb-like cells that are each configured to function as a "Helmholtz resonator," and which are permeable to permit high temperature anti-icing air to "transpire" through them to effect anti-icing protection for the inlet.

Figure 2:
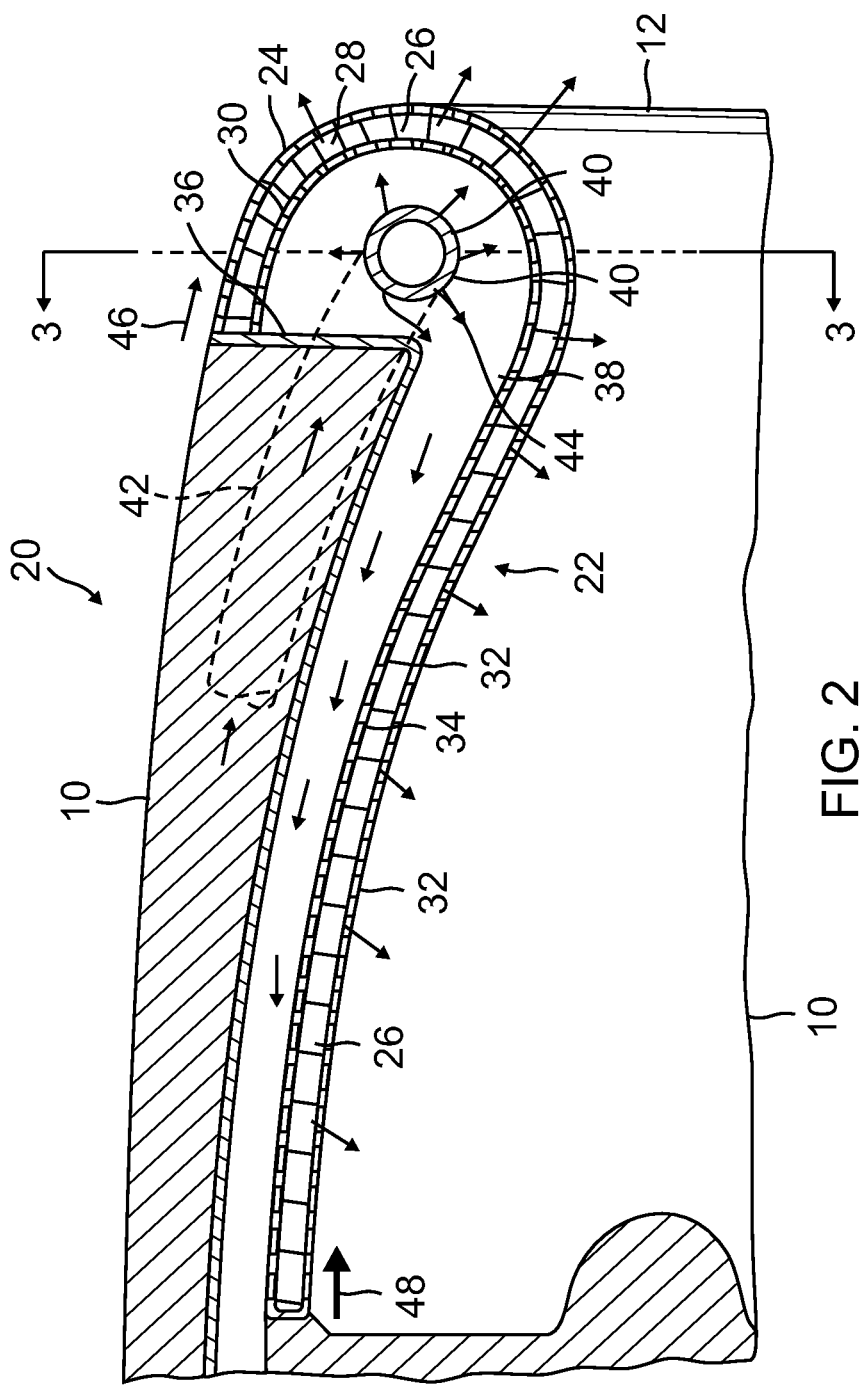
FIG. 2 is a partial cross-sectional view of the jet engine air inlet of FIG. 1, as seen along the lines of the section 2-2 taken in FIG. 1, showing details of a prior art anti-icing and engine noise-attenuating system.
Figure 3:
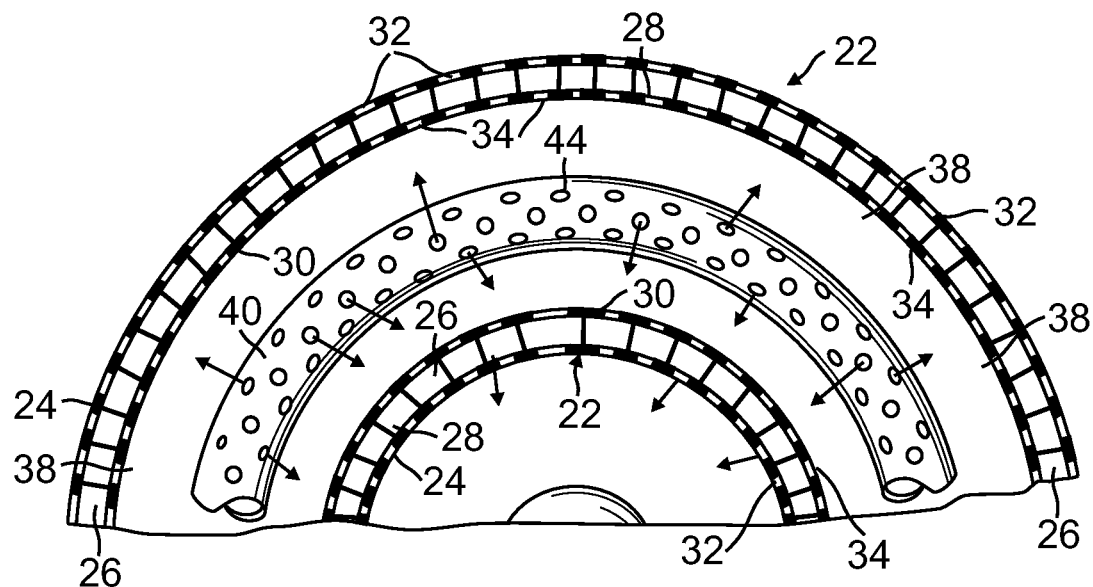
FIG. 3 is a partial cross-sectional view of the prior art anti-icing and engine noise-attenuating system, as seen along the lines of the section 3-3 taken in FIG. 2.

FIG. 2 is a partial cross-sectional view of the jet engine air inlet 10 of FIG. 1, as seen along the lines of the section 2-2 taken therein, showing details of a prior art anti-icing and engine noise-attenuating system 20 of the type described above. FIG. 3 is a partial cross-sectional view of the prior art system 20, as seen along the lines of the section 3-3 taken in FIG. 2, and FIG. 4 is a partial exploded cross-sectional perspective view of a porous lip skin 22 of the prior art system 20.

Figure 4:
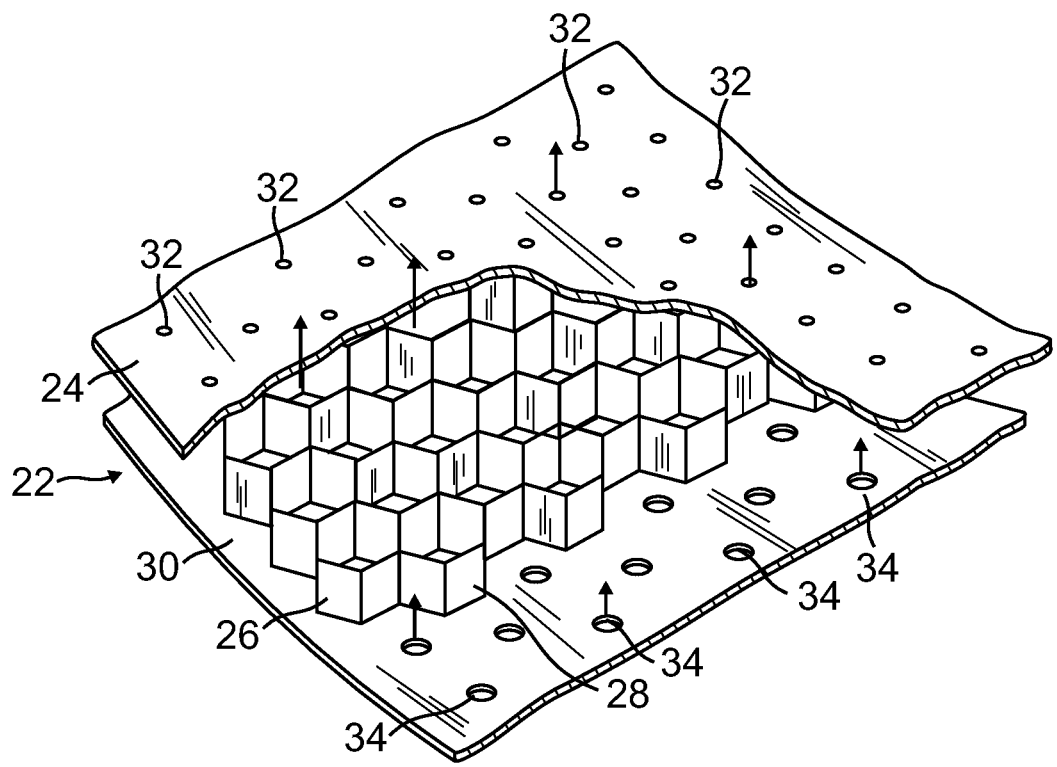
FIG. 4 is a partial exploded cross-sectional perspective view of the porous lip skin of the prior art anti-icing and engine noise-attenuating system of FIG. 2.

As can be seen in FIGS. 2-4, in the particular prior art system 20 illustrated, the lip skin 22 is recurvate and can extend from a location from well inside the inlet 10 to a location well past, i.e., above and behind, the highlight 12 of the inlet 10. As illustrated in the exploded view of FIG. 4, the lip skin 22 comprises three layers, viz., an outer skin 24, a "core" or gridwork layer 26 defining a plurality of contiguous, hexagonal cells 28, and an inner or "cap" skin 30. The outer skin 24 contains a plurality of pores or openings 32, each of which is disposed in fluid communication with a corresponding one of the cells 28. Sound waves enter the cells 28 through the openings 32, and pressurized air from the cells 28 exits or "transpires" from the lip skin 22 through the openings 32. In a similar manner, the inner or cap skin 30 also includes a plurality of apertures 34, each of which is disposed in fluid communication with a corresponding one of the cells 28, and through which air can flow into the cells 28 from a plenum 38 located inside of the inlet 20, i.e., in the direction of the arrows in the figures. The cells 28 of the core layer 26 are configured to function as "Helmholtz resonators," such that engine noise propagating forwardly from the associated jet engine and impinging on the lip skin 22 is appreciably attenuated by them.

As illustrated in FIG. 2, the front end of the lip skin 22 abuts and is attached to an L-shaped bulkhead 36 forming a wall of a closed, circumferential plenum 38 that is disposed over the inner surface of the cap skin 30. Because the forward portion of this plenum 38 is generally D-shaped in cross-section, it is sometimes referred to as the "D-nose," or "D-duct" of the inlet 20. Thus, if "bleed air," i.e., high temperature, pressurized air bled off from a compressor stage of the associated engine, is introduced into the volume of the D-duct or plenum 38 and circulated or "swirled" therein, the backside or inner surface of the lip skin 22 will be heated by convection, and a portion of the high temperature air will flow through the apertures 34, into respective ones of the cells 28, and thence, out from the cells 28 through the openings 32 of the outer skin 24, to effect the anti-icing function.

Circulation of the high temperature air in the plenum 38 can be effected in one, the other, or both of two ways. In the particular prior art embodiment illustrated in the figures, a fenestrated, donut-shaped pipe, or "piccolo tube" 40, is disposed within the D-duct 38 and fed by a delivery tube 42 (see FIG. 2) with engine bleed air. The air is introduced into and distributed throughout the D-duct or plenum 38 through multiple openings 44 contained in the piccolo tube 42, i.e., in the direction of the arrows shown in FIGS. 2 and 3. Alternatively, the piccolo tube 44 can be omitted, and the air distribution openings 44 can instead be formed in the delivery tube 42 itself, in which case, the delivery tube 42 is referred to as "swirl tube." Of course, both mechanisms, i.e., both a piccolo tube and a swirl tube, can be used to deliver anti-icing air to the plenum 38.

Although the prior art anti-icing and noise-attenuating systems such as the system 20 described above can function satisfactorily in many flying conditions, they can also experience some problems in other circumstances. For example, the transpiration system in some cases may not distribute the hot bleed air efficiently within the system 20. Accordingly, the system 20 could require unnecessarily large amounts of hot air to be bled from the engine, which can reduce engine thrust and overall aircraft performance. Further, the distribution of the hot air passing through the acoustic lip 22 can be altered by pressure gradients on the inner surface of the inlet 10 due to the inlet flow field. Thus, the pressure at any point in the inlet flow field can be a function of the location in the flow field, aircraft attitude, and the engine power setting. The altered hot air distribution can thus reduce the efficiency with which the system operates.

More seriously, it is possible in some situations for the air outlet "pores" 32 of the transpiring lip 22 of the inlet 10 to become occluded with, e.g., ice, dirt, insects, volcanic ash, or other detritus, so as to substantially block the flow of air through the lip 22. This can not only substantially degrade or completely interrupt anti-icing protection of the inlet 10, but under the appropriate circumstances, e.g., with an engine bleed-air pressure regulator valve locked in an open condition, could, as a result of an internal overpressurization of the inlet plenum 38, result in the inlet 10 of the engine becoming separated from the engine nacelle 16, e.g., at the locations of the arrows 46 and 48 shown in FIG. 2.

Figure 5:
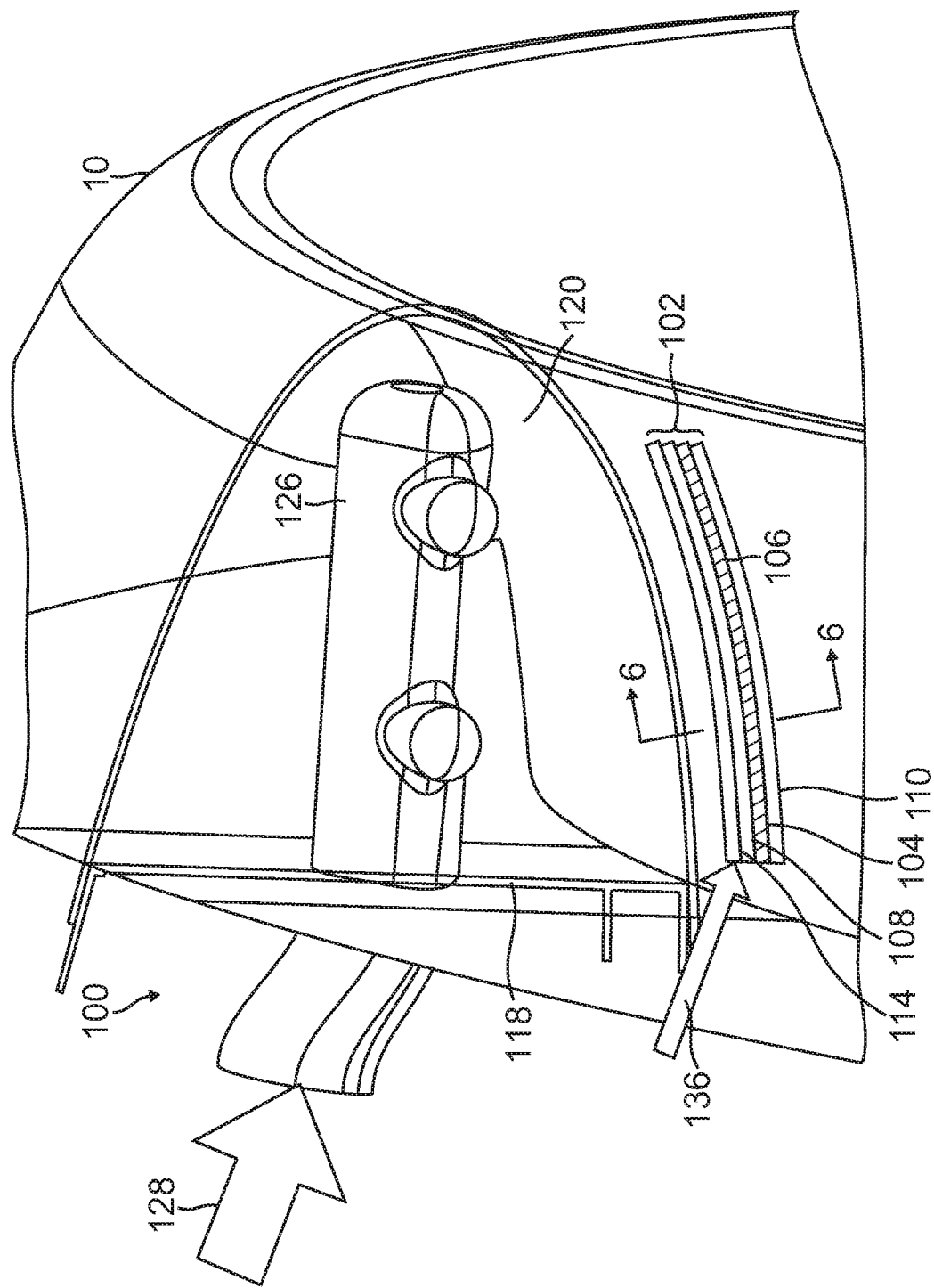
FIG. 5 is a partial schematic perspective view of a jet engine inlet incorporating an example embodiment of an anti-icing and engine noise-attenuating system in accordance with an embodiment of the present disclosure.
Figure 6A:
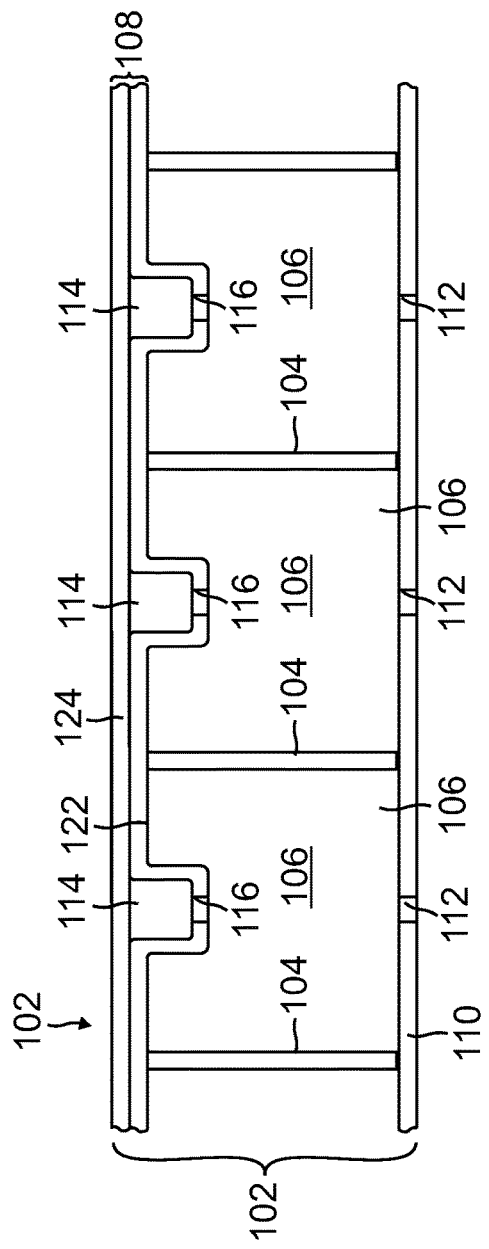
FIGS. 6A and 6B are partial cross-sectional views of two alternative example embodiments of a porous inlet lip skin of the anti-icing and engine noise-attenuating system of FIG. 5, as seen along the lines of the section 6-6 taken in FIG. 5 showing an outer skin, a rigid frame, a serpentine manifold and a cap skin thereof in accordance with embodiments of the present disclosure.
Figure 6B:
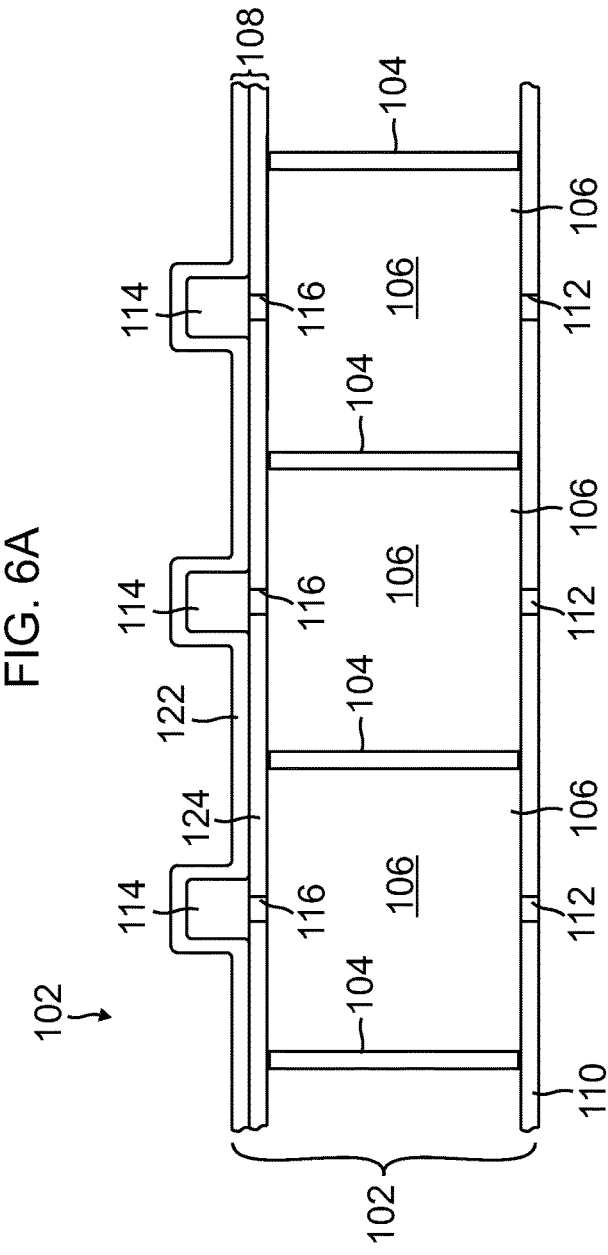

FIG. 5 is a partial schematic perspective view of a jet engine inlet 10 incorporating an example embodiment of an anti-icing and engine noise-attenuating system 100 in accordance with the present disclosure which overcomes the above and other problems of the prior art, and FIGS. 6A and 6B are partial cross-sectional views of two alternative example embodiments of a multilayered, transpiring inlet lip skin 102 of the system 100.

As illustrated in FIGS. 5, 6A, and 6B, the layered lip skin 102 of the system includes a strong, rigid frame 104 defining a gridwork of contiguous cells 106. A cap skin 108 is sealingly attached, e.g., by brazing or adhesive bonding, to an inner surface of the frame 104, and an outer skin 110 is sealingly attached to an outer surface of the frame 104. The outer skin 110 contains a plurality of openings 112, each of which is disposed in fluid communication with a corresponding one of the cells 106.

Of importance, a serpentine manifold 114 extends adjacent to an inner end of each of the cells 106, and contains a plurality of apertures 116 in a sidewall thereof. Each of the apertures 116 in the manifold 114 is disposed in fluid communication with a corresponding one of the cells 106. An interior bulkhead 118 of the inlet 10 forms a rear wall of a closed, circumferential D-duct, or plenum 120 that overlies and sealingly covers the inner surface of the cap skin 108.

As illustrated in FIGS. 6A and 6B, the serpentine manifold 114 of the transpiring lip skin 102 can be implemented in a number of ways. For example, as illustrated in FIG. 6A, the cap skin 108 can comprise a first skin 122, e.g., a stamping or a drawn or hydro-formed sheet metal part, that contains an open channel corresponding to the desired configuration of the manifold 114, and a second skin 124 that is attached, e.g., by brazing or adhesive bonding, to the first skin 112 to close the open side of the channel. This assembly can then be attached to the inner surface of the rigid frame 104, e.g., by brazing or bonding, such that the conduit 114 is disposed at the inner ends of the cells 106. Alternatively, as illustrated in FIG. 6B, the positions of the first and second skins 122 and 124 can be reversed, such that the manifold 114 is disposed over the inner ends of the cells 106. In either embodiment, the apertures 116 of the manifold 114 can be punched, stamped or drilled either before or after the two sheets 122 and 124 are joined to each other.

In yet another embodiment, the cap skin 108 can comprise a single sheet of material, e.g. a metal, such as an aluminum alloy, and the manifold 114 can comprise a length of tubing, for example, an aluminum extrusion having, e.g., a round or rectangular cross-section, corresponding to the desired shape of the manifold 114. As in the above embodiments, the tubing can be attached, e.g., by brazing, to either the inner or the outer surface of the single cap skin 108, such that the manifold 114 is disposed at or above the inner ends of the cells 106, as illustrated in FIGS. 6A and 6B, respectively.

In one advantageous embodiment, the rigid frame 104 of the transpiring lip 102 can comprise a casting, e.g., a die casting or an investment casting. This enables the cells 106 to be configured in terms of both their size and shape repeatably and with precision. For example, the cells 106 can be configured as polygons, e.g., squares, as illustrated in, e.g., FIGS. 7 and 8, or hexagons, as illustrated in FIG. 4 above. This, in turn, enables them to be easily configured as Helmholtz resonators having predictable frequency bands and levels of engine noise attenuation. Further in this regard, it should be understood that the various "layers" of the transpiring lip skin 102, i.e., the frame 104, the outer and cap skins 110 and 108, and the serpentine manifold 114, are all arcuate or curved, at least in the circumferential direction, and typically, can extend around the entire circumference of the engine inlet 10. Accordingly, in some embodiments, it may be advantageous to fabricate the inlet lip 102 in circumferential segments that are subsequently attached to each other end-to-end.

Figure 7:
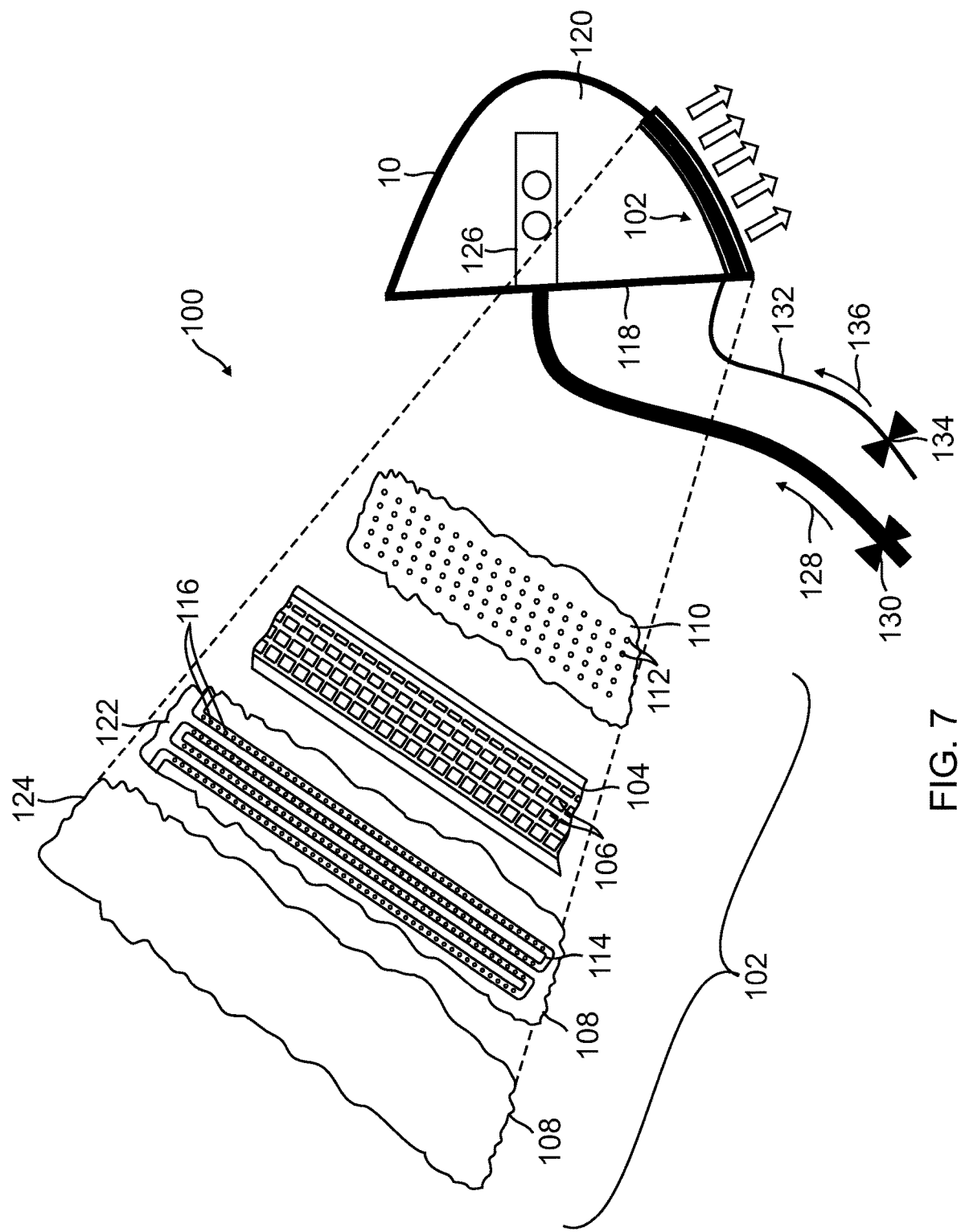
FIG. 7 is a partial cross-sectional and schematic perspective view of the example system of FIG. 5, showing the example porous inlet lip skin in exploded form in accordance with an embodiment.

FIG. 7 is a partial cross-sectional and schematic perspective view of the example system 100 similar to FIG. 5, but showing the D-duct or plenum 120 in cross-section, and the porous inlet lip skin 102 in exploded form. In the embodiment of FIG. 7, the serpentine manifold 114 is shown disposed between the frame 104 and the second skin 124, but as discussed above in connection with FIGS. 6A and 6B, their relative positions can be reversed, such that the second skin 124 is disposed between the frame 104 and the manifold 114.

Referring now to FIGS. 5 and 7, the example system 100 further includes a first air supply tube 126, which can comprise a conventional swirl tube, a piccolo tube or both a swirl tube and a piccolo tube, as described above, that extends through the rear bulkhead 118 and supplies high temperature engine bleed air 128 through a throttle valve 130 at, for example, a relatively low pressure and a relatively high rate of flow, e.g., as might be supplied by a "low" compressor stage of the jet engine, to the D-duct or plenum 120 of the inlet 10. By contrast, the serpentine manifold 114, and hence, the lip skin 102, is independently supplied through a separate conduit 132 and throttle valve 134 with high temperature bleed air 136 at, for example, a relatively high pressure and a relatively low rate of flow, as might be supplied by, e.g., a "high" compressor stage of the engine. Alternatively, the plenum 120 and lip skin 102 could be supplied from the same source of air that is separately regulated, in terms of pressure and/or flow rate by suitable regulator valves, the same as or different from each other.

Thus, an important advantage provided by the serpentine manifold 114 of the present system 100 over the prior art system 20 above is that it enables the inlet lip skin 102 to be supplied with anti-icing bleed air separately or independently from the plenum 120, for example, with relatively high pressure air that the manifold 114 distributes directly, by impingement, and with substantial uniformity, over the relatively large area of the inner surface of the outer skin 110, while still retaining the relatively low pressure, high rate of flow, convective or "swirl" circulation heating of the interior surface of the D-duct 120, including the inner surface of the inlet lip 102.

Figure 8:
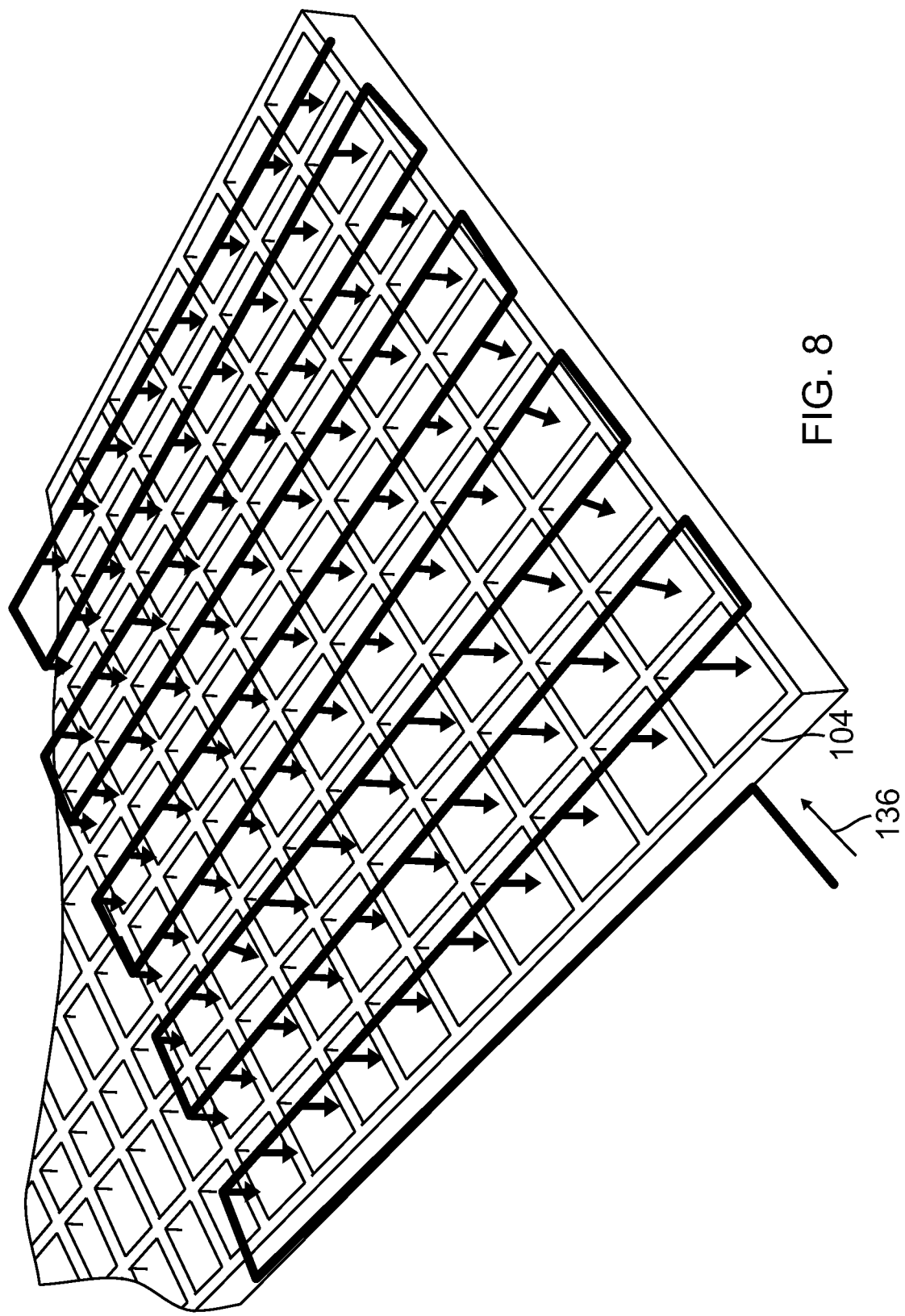
FIG. 8 is an upper perspective view of the example porous inlet lip skin of FIGS. 5-7, in which the outer skin, serpentine manifold and cap skin have been omitted to illustrate the distribution by the serpentine manifold of high pressure anti-icing engine bleed air to respective ones of a plurality of contiguous cells of the rigid frame in accordance with an embodiment; and, FIGS. 9A and 9B are schematic representations illustrating a comparison of the differences in pressure distribution between the prior art anti-icing and engine-noise-attenuating system of FIGS. 2-4 and that of an embodiment of the present disclosure.

FIG. 8 is an upper perspective view of the example inlet lip skin 102, in which the outer skin 110, serpentine manifold 114 and cap skin 108 have been omitted to illustrate the above direct impingement heating and uniform distribution by the serpentine manifold 114 of the high pressure, low flow rate anti-icing engine bleed air 136 to the respective cells 106 of the rigid frame 104. In this regard, it should be noted that the apertures 116 of the manifold 114 can be varied in size and location to easily "focus" anti-icing heat into critical locations on the inlet 10.

Figure 9A:
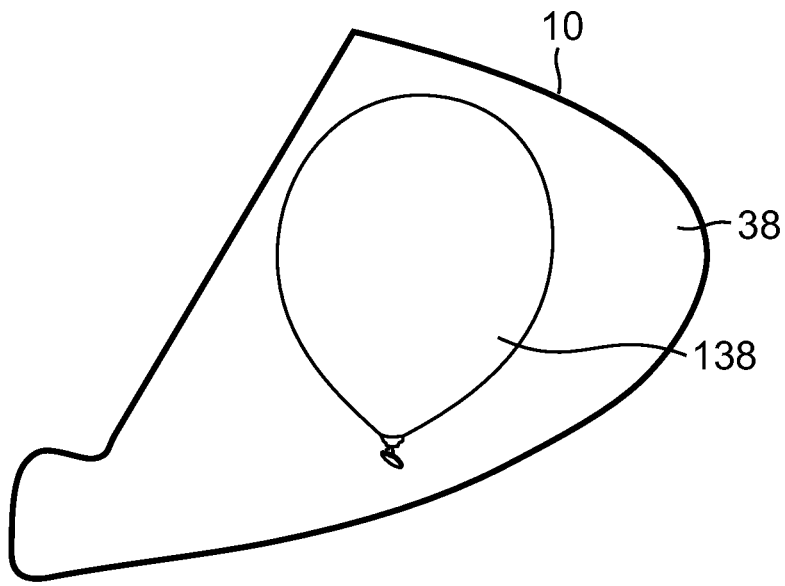
Figure 9B:
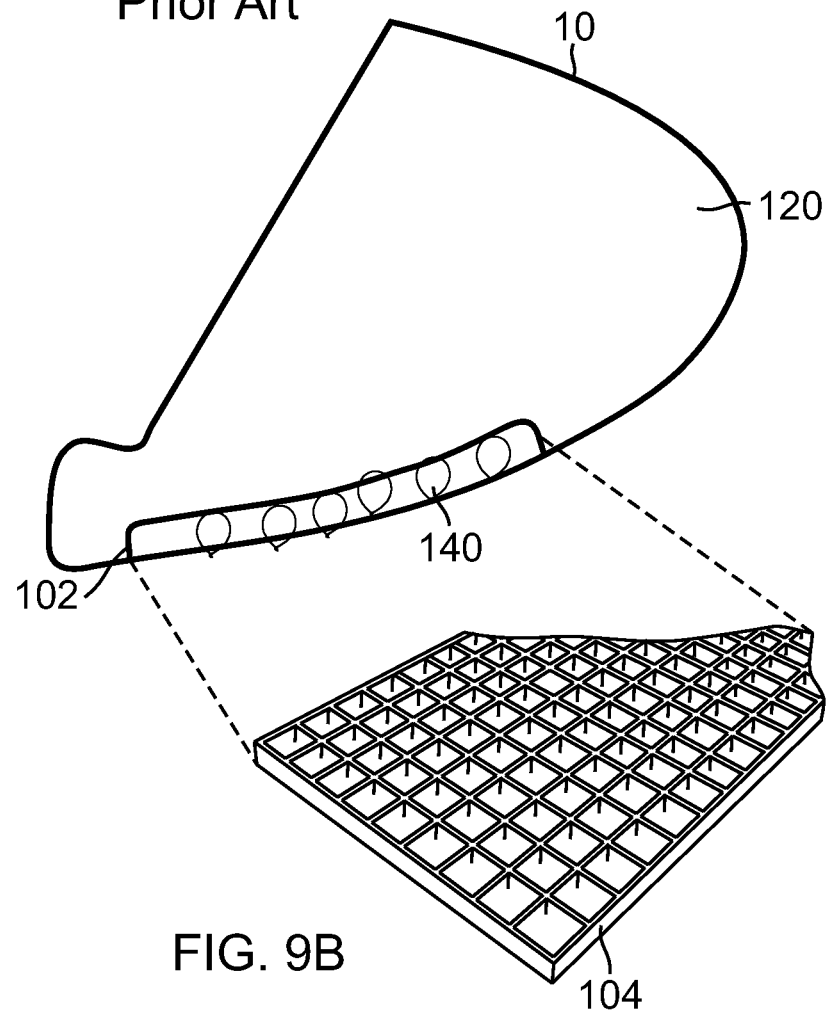

An additional problem of the prior art system 20 overcome by the present system 100 relates to the situation in which the pores or anti-icing air outlet openings 32 of the transpiring inlet lip 22 become blocked, e.g., by ice, dirt, ash or the like, causing the pressure inside the plenum 38 to increase substantially, because 1) jet engine anti-icing air supply valves require flow to regulate the pressure, and 2) anti-ice systems need to be operated with their pressure regulator valves locked open. Thus, as illustrated in FIG. 9A, this situation can result in a rapid overpressurization of the relatively large plenum 38, as represented by the large "balloon" 138 in FIG. 9A, potentially causing the inlet 10, including the de-icing system 20, to be separated from the front end of the engine nacelle 16. By contrast, the present system 100 confines the high pressure anti-icing air 136 within the relatively strong serpentine manifold 114 and the cells 106 of the rigid frame 104 of the transpiring lip 192, as represented by the small balloons 140 of FIG. 9B, while the relatively larger volume of the plenum 120 is pressurized with anti-icing air at a relatively low pressure. In sum, even if all of the outlet openings 112 of the transpiring lip 102 become completely blocked, both of the independently pressurized structures of the present system 100 can safely withstand the maximum internal pressures to which they could respectively be exposed.

As those of some skill will by now appreciate, and depending on the particular application at hand, many modifications, substitutions and variations can be made in and to the materials, apparatus, configurations and methods of making and using the noise attenuating, anti-icing jet engine air inlets of the present disclosure without departing from the spirit and scope thereof. In light of this, the scope of the present invention should not be limited to those of the particular embodiments illustrated and described herein, as they are merely by way of some examples thereof, but rather, should be fully commensurate with that of the claims appended hereafter and their functional equivalents.

What is claimed is:

1. A jet engine air inlet, comprising:
a rigid frame defining a gridwork of contiguous cells;
a cap skin having an outer surface sealingly attached to an inner surface of the frame;
an outer skin having an inner surface sealingly attached to an outer surface of the frame and containing a plurality of outlet openings therein, each outlet opening being disposed in fluid communication with a corresponding one of the cells;
a serpentine manifold comprising a conduit disposed within the cap skin and extending along and adjacent to an inner end of each of a plurality of the cells and containing a plurality of apertures in a sidewall of the serpentine manifold, each aperture in direct fluid communication with a corresponding one of the plurality of the cells; and
a plenum sealingly covering an inner surface of the cap skin.

2. The inlet of claim 1, wherein the cap skin comprises a first skin containing an open channel corresponding to the serpentine manifold and a second skin sealingly disposed on the first skin and closing the channel to form the conduit, and wherein the rigid frame, the cap skin, and the outer skin are configured to be in direct fluid communication via the apertures, the corresponding ones of the plurality of the cells, and the outlet openings.

3. The inlet of claim 1, wherein the manifold comprises a length of tubing comprising the conduit and disposed on the inner or the outer surface of the cap skin.

4. The inlet of claim 1 wherein the plenum comprises a portion of a D-duct of a jet engine air inlet and the outer skin comprises a lip skin of the inlet.

5. The inlet of claim 1, wherein at least one of the cells comprises a Helmholtz resonator such that engine noise propagating from the jet engine and impinging on a lip skin is attenuated by at least one of the cells.

6. The inlet of claim 1, further comprising:
a first air controller configured to introduce a first source of air at a first pressure and a first flow rate into the manifold; and
a second air controller configured to introduce a second source of air at a second pressure and a second flow rate into the plenum.

7. The inlet of claim 6, wherein:
the air comprises bleed air from a jet engine;
the first source comprises at least one first throttle valve; and
the second source comprises at least one second throttle valve.

8. The inlet of claim 7, wherein the second source further comprises a swirl tube, a piccolo tube, or both a swirl tube and a piccolo tube.

9. The inlet of claim 1, wherein at least one of the cells is polygonal, and wherein one or more of the plurality of apertures varies in size among the corresponding ones of the plurality of the cells.

10. The inlet of claim 1, wherein the frame comprises a casting.

11. A method for making the jet engine air inlet of claim 1, the method comprising:
providing the rigid frame defining the gridwork of contiguous cells;
sealingly attaching the outer surface of the cap skin to the inner surface of the frame;
sealingly attaching the inner surface of the outer skin to the outer surface of the frame such that each of the plurality of the outlet openings contained in the outer skin is disposed in fluid communication with the corresponding one of the cells;
extending the serpentine manifold comprising the conduit disposed within the cap skin along and adjacent to the inner end of each of the plurality of the cells such that each of the plurality of apertures contained in the sidewall of the serpentine manifold is in direct fluid communication with the corresponding one of the plurality of the cells; and
sealingly covering the inner surface of the cap skin with the plenum, wherein the outer skin comprises a lip skin of the jet engine air inlet, and the plenum comprises a portion of a D-duct of the inlet.

12. The method of claim 11, further comprising:
introducing, by a first controller, air at a first pressure and a first flow rate into the manifold; and
introducing, by a second controller, air at a second pressure and a second flow rate into the plenum.

13. The method of claim 12, wherein:
the introducing comprises bleeding air from a compressor stage of the jet engine.

14. The method of claim 11, wherein the extending comprises forming an open channel corresponding to the serpentine manifold in a first skin and sealingly attaching a second skin on the first skin so as to close the channel to form the conduit, the method further comprising providing, by the rigid frame, the cap skin, and the outer skin, the direct fluid communication via the apertures, the corresponding ones of the plurality of the cells, and the outlet openings.

15. The method of claim 11, wherein the extending comprises attaching a length of tubing comprising the conduit to the inner or the outer surface of the cap skin.

16. The method of claim 11, further comprising configuring at least one of the cells to form a Helmholtz resonator such that engine noise propagating from the jet engine and impinging on the lip skin is attenuated by at least one of the cells.

17. A jet engine, comprising an air inlet disposed at a front end of the engine, the inlet including:
a lip skin containing a plurality of outlet openings,
a rigid frame defining a gridwork of contiguous cells and having an outer surface attached to an inner surface of the lip skin such that each of the outlet openings in an outer skin is disposed in fluid communication with a corresponding one of the cells,
a cap skin having an outer surface sealingly attached to an inner surface of the frame,
a serpentine manifold comprising a conduit disposed within the cap skin extending along and adjacent to an inner end of each of a plurality of the cells and containing a plurality of apertures in a sidewall of the serpentine manifold, each aperture in direct fluid communication with a corresponding one of the plurality of the cells, and
a D-duct comprising a portion of a plenum sealingly covering an inner surface of the cap skin.

18. The jet engine of claim 17, further comprising:
a first air controller configured to convey air into the manifold at a first pressure and a first flow rate; and
a second air controller configured to covey air into the plenum at a second pressure and a second flow rate.

19. The jet engine of claim 18, wherein:
the air conveyed by at least one of the first and second controllers comprises bleed air from the engine, and wherein the rigid frame, the cap skin, and the outer skin are configured to provide the direct fluid communication via the apertures, the corresponding ones of the plurality of the cells, and the outlet openings.

20. The jet engine of claim 17, wherein at least some of the cells comprise Helmholtz resonators such that engine noise propagating from the jet engine and impinging on the lip skin is attenuated by at least one of the cells.

* * * * *